(12) United States Patent
Shiraiwa

(10) Patent No.: US 6,582,162 B2
(45) Date of Patent: Jun. 24, 2003

(54) TOOL FOR CHIP REMOVING MACHINING HAVING A SCREW-ACTUATED CLAMP

(75) Inventor: Akio Shiraiwa, Kobe (JP)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/139,366

(22) Filed: May 7, 2002

(65) Prior Publication Data
US 2002/0172568 A1 Nov. 21, 2002

(30) Foreign Application Priority Data
May 7, 2001 (SE) .............................................. 0101565

(51) Int. Cl.[7] .............................. B23P 15/28; B23P 29/00
(52) U.S. Cl. ...................................... 407/101; 407/104
(58) Field of Search ............................ 407/4, 6, 73, 77, 407/100, 101, 102, 103, 104, 107, 108

(56) References Cited
U.S. PATENT DOCUMENTS 4,430,031 A * 2/1984 Hellstrom .................... 407/104
4,730,525 A * 3/1988 Kelm .......................... 407/104
6,158,928 A * 12/2000 Hecht .......................... 407/102

FOREIGN PATENT DOCUMENTS

JP 2000-254806 9/2000

* cited by examiner

Primary Examiner—Willmon Fridie, Jr.
(74) Attorney, Agent, or Firm—Burns, Doane, Swecker & Mathis, LLP

(57) ABSTRACT

A tool for chip removing machining includes a holder having a top side in which is formed a seat for a cutting insert to be clamped by a clamping mechanism. That clamping mechanism includes a clamping body movable inside a cavity formed in the holder. The body carries a finger which passes through a hole formed in a bottom surface of the seat and engages the cutting insert. A rotatable screw is provided in a bore of the holder and extends into the cavity. The screw is formed with a thick first portion, as well as a thinner second portion having a male thread which is in engagement with a female thread formed in a through-hole of the clamping body. The bore in the holder is cylindrical and has a smooth surface, and the thick portion of the screw has a cylindrical smooth envelope surface which is rotatably mounted in the bore. A free end of the screw is supported by an end wall of the holder. The finger is completely surround by the bottom surface of the seat.

17 Claims, 4 Drawing Sheets

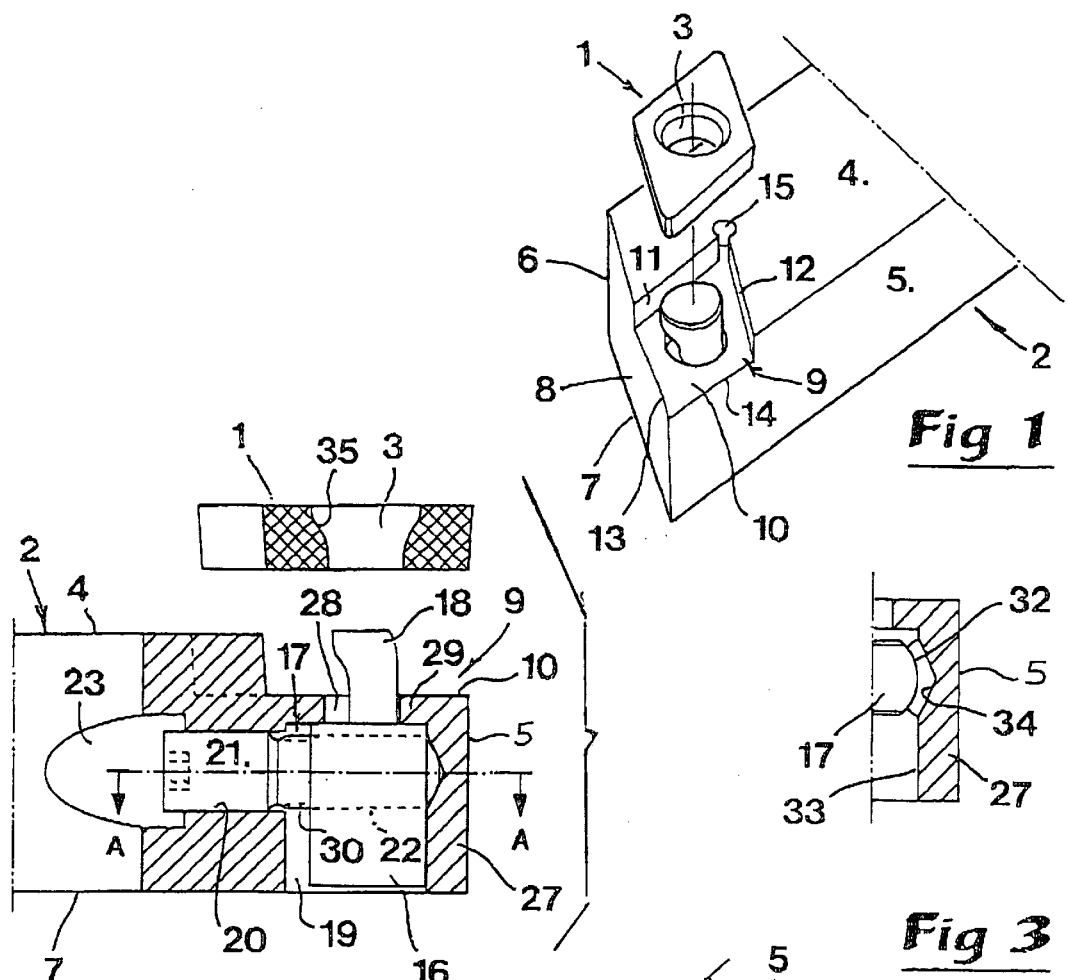
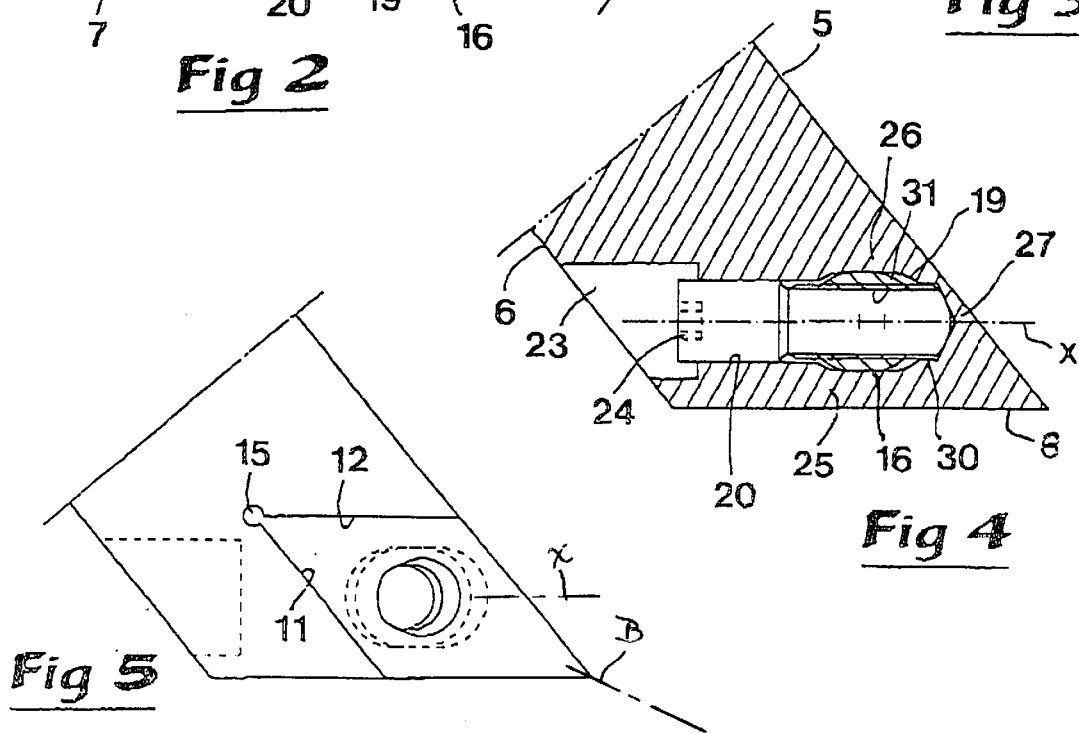
Fig 1
Fig 2
Fig 3
Fig 4
Fig 5

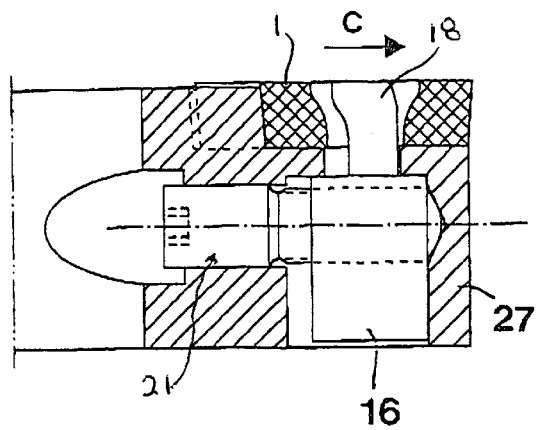
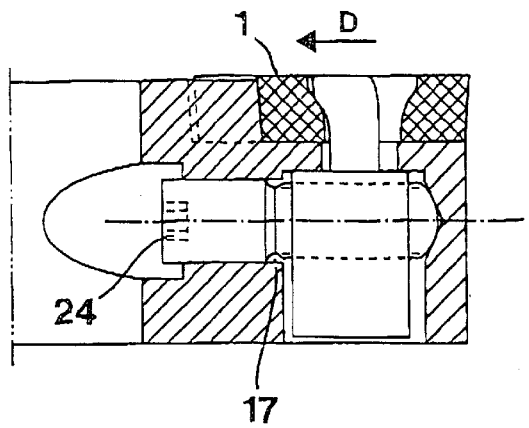
Fig 7
Fig 9
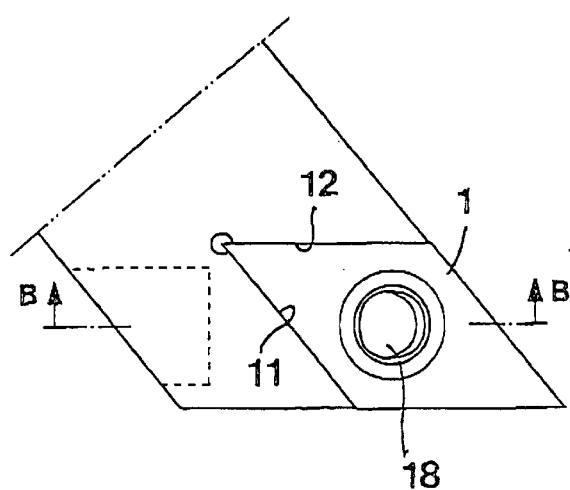
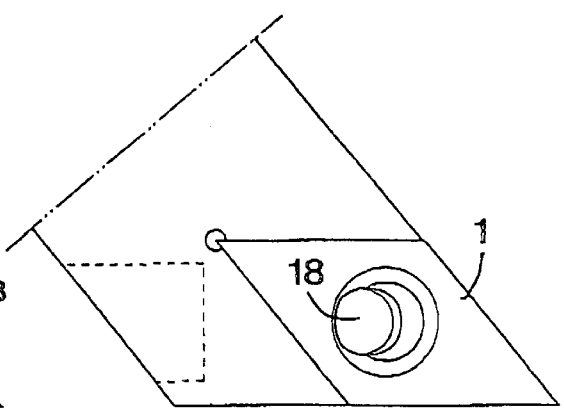
Fig 6
Fig 8

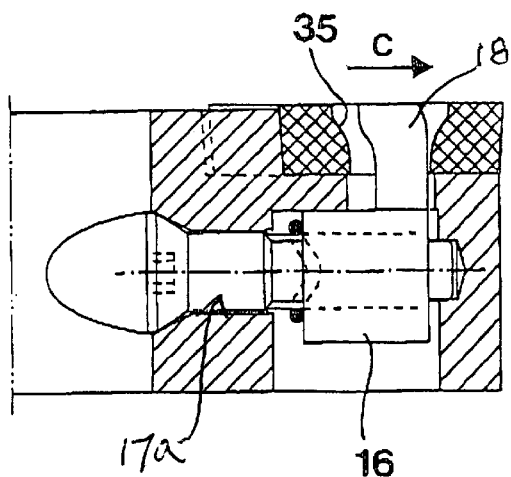
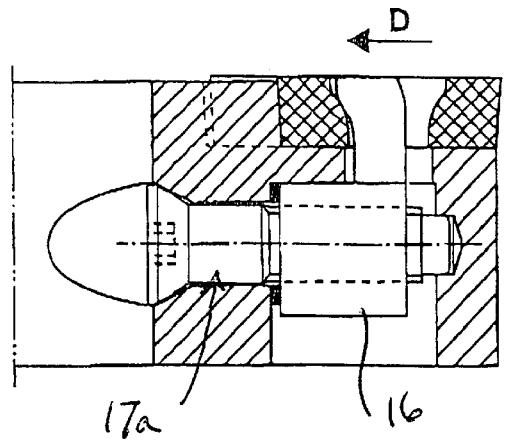
Fig 10   Fig 11
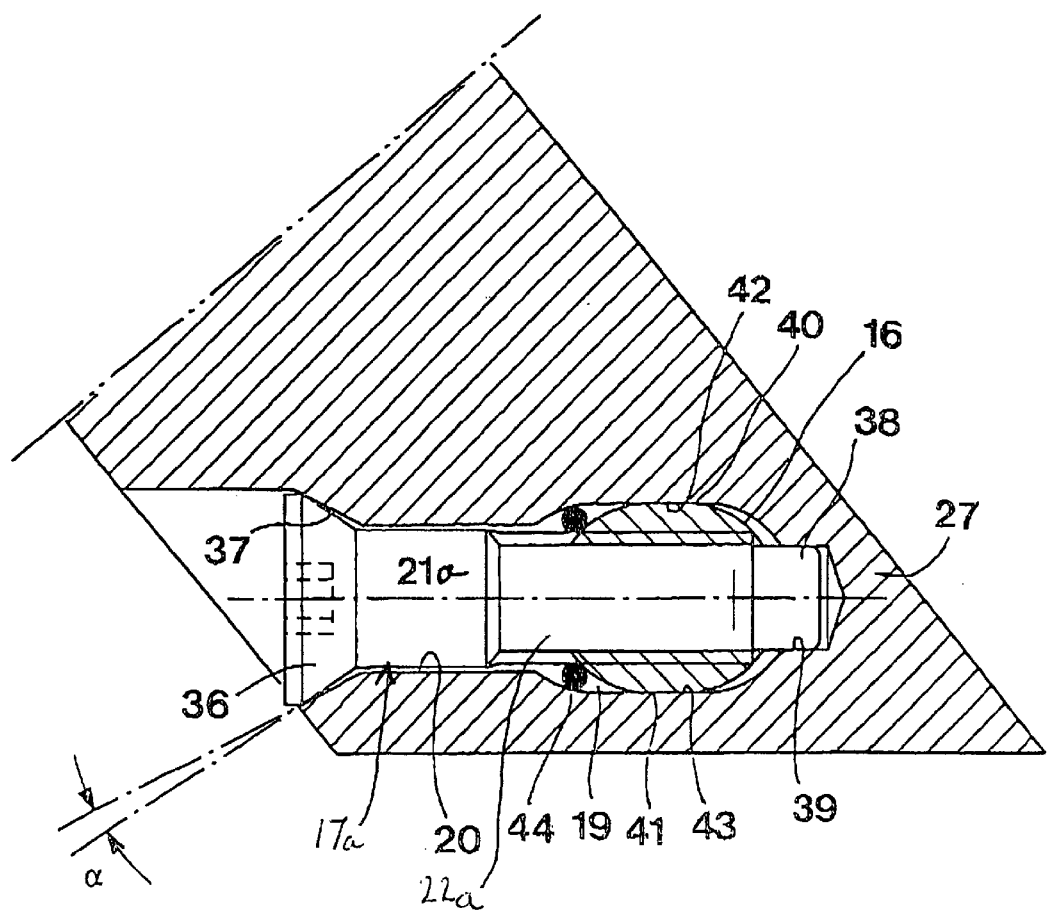
Fig 12

TOOL FOR CHIP REMOVING MACHINING HAVING A SCREW-ACTUATED CLAMP

This application claims priority under 35 U.S.C. §§119 and/or 365 to Patent Application Serial No. 0101565-0 filed in Sweden on May 7, 2001, the entire content of which is hereby incorporated by reference.

TECHNICAL FIELD OF THE INVENTION

This invention relates to a tool intended for chip removing machining, including a holder having a seat formed in a first side for a cutting insert of the type that includes a hole for clamping the same. The clamping is performed by means of a clamping mechanism that comprises a clamping body provided with a finger, which is movable backwards and forwards inside a cavity in the interior of the holder and cooperates with a screw arranged in a bore formed in the holder. The bore ports in a second side of the holder, distanced from said first side, with the purpose of enabling access to the screw from a direction other than from the first side along which the seat is located. The screw is formed with a thick, first portion, as well as a thinner, second portion, having a male thread which is in engagement with a female thread in a through hole in the clamping body.

Tools of the kind in question are used primarily for the machining, in particular turning, of metallic work pieces.

PRIOR ART

A chip removing tool or cutting tool of the above-mentioned type is previously known from the Japanese patent application JP 2000-254 806. Generally characteristic of this known cutting tool is that the holder for the cutting insert has the shape of a long narrow, cross-section-wise quadrangular shaft in which the seat for the cutting insert is formed in a first side (top side) of the four sides that define the shaft. More precisely, the seat is placed in connection with an acutely angled corner at a front end of the shaft. In this case, a cavity for the clamping body is formed in a linear extension of a threaded bore for a screw for tightening the clamping body. In other words, the cavity and the threaded bore form a through hole, porting in two parallel sides, extending perpendicularly to the first side in which the seat is formed. In the embodiment example according to said Japanese patent application, the through hole extends at an acute angle (approx. 60°) to the longitudinal axis of the shaft. The clamping body is cylindrical and has a central through hole with a female thread. The tightening screw is formed with two male threads, viz., a first male thread that is formed on a thick, first portion of the screw and is in engagement with a female thread in said bore in the shaft, and a second male thread that is formed on a second, thinner portion of the screw and is in engagement with said female thread inside the clamping body. At the end of the thick portion of the screw, accessible from the outside, a socket for a spanner is present. Clamping of the cutting insert in the seat is carried out by tightening the screw in the clamping body. Release of the cutting insert is achieved by the screw being screwed out from the clamping body. Thanks to the fact that one of the male threads (together with the appurtenant female thread) is left hand-threaded and the other male thread (together with the appurtenant female thread) is right hand-threaded, clamping and release, respectively, of the cutting insert may be effected quickly.

A substantial advantage of the known cutting tool is that the screw for clamping the cutting insert is accessible from a side of the shaft or holder other than the side in which the cutting insert is mounted. Thus, the spanner for the screw does not need to be inserted into the spanner socket of the screw from the topside of the cutting insert, such as the case is in conventional cutting tools. In this way, a plurality of cutting tools can be mounted very near each other in a machine.

However, the cutting tool known from JP 2000-254 806 is also associated with disadvantages. One disadvantage is that the cavity for the clamping body is open in the side of the shaft opposite the screw bore, whereby the clamping body is inserted from that opposite side while the finger on the clamping body passes through an open slot formed in the bottom of the cutting seat. This means that the support of the cutting insert against the bottom surface of the seat becomes unsatisfactory. When the cutting insert, during operation, is exposed to stresses, the thin-material portions on both sides of the slot for the finger may give way. Furthermore, the cutting insert completely lacks support in the area of the outer end of the slot. Another disadvantage is that the screw after a certain time of usage, risks being deformed by bending in connection with the repetitive clamping operations, since only one end of the screw is actually supported, i.e., the screw is supported in cantilever fashion. An additional disadvantage of the known construction is that the same includes no less than four threads, viz. two male threads on the screw and two female threads (in the bore in the shaft and the hole in the clamping body, respectively). To produce threads is a generally cost-demanding machining operation which entails that the cutting tool in its entirety becomes expensive to manufacture.

AIMS AND FEATURES OF THE INVENTION

The present invention aims at obviating the above-mentioned disadvantages of the previously known cutting tool and at providing an improved cutting tool. Therefore, a primary aim of the invention is to provide a cutting tool that guarantees a satisfactory support for the cutting insert in spite of the existence of a cavity for a clamping body beneath the bottom of the cutting insert. Another aim of the invention is to minimise the risk of bending deformations in the screw and clamping body, respectively. Yet another aim is to provide a cutting tool, the clamping body of which is controlled in such a way in the cavity that the finger engaging in the hole of the cutting insert does not tilt. In other words, the finger should in a reliable way always be pressed against one and the same contact place in the hole in the cutting insert. It is also an aim to minimise the number of threads, with the purpose of reducing the total cost for the manufacture of the cutting tool, as well as guaranteeing an optimum precision in the movements of the clamping body and the screw.

According to the invention, at least the primary aim is attained by a tool for chip removing machining which comprises a holder that includes first, second, third, and fourth sides. An insert seat is formed in the first side for receiving a cutting insert. The seat includes a bottom surface and an upright support surface. The bottom surface includes a hole formed therethrough. The second side is disposed opposite the first side. Each of the third and fourth sides interconnects the first and second sides, with the fourth side disposed opposite the third side. A cavity is formed within the holder and communicates with the cavity. A bore extends from the third side toward the fourth side and communicates with the cavity. The bore is spaced from the first side. A clamping body is disposed in the cavity and is movable in a direction parallel to a center axis of the bore. The clamping body includes a through-hole extending along the center axis. The through-hole includes a female screw thread. A finger projects from the clamping body and extends through the hole, the hole being of larger cross-section than the finger. A rotatable screw is provided which includes first and second ends and an intermediate portion. The first end is disposed in the bore. The intermediate portion is disposed within the through-hole of the clamping body and includes a male screw thread in threaded engagement with the female screw thread. The second end is supported by an end wall defined by the fourth side. The finger is completely surrounded by the bottom surface of the insert seat.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 1 is a partial perspective exploded view of a cutting insert included in a cutting tool according to the invention, and a holder for the same, more precisely in the form of a shaft.

FIG. 2 is an exploded image showing the shaft of the tool and the cutting insert in a vertical section.

FIG. 3 is a vertical detailed section.

FIG. 4 is a horizontal section A—A in FIG. 2.

FIG. 5 is a planar view from above of the tool shaft showing the seat for the cutting insert of the tool shaft.

FIG. 6 is a planar view from above of the tool shaft with the cutting insert mounted in an unclamped state.

FIG. 7 is a section B—B in FIG. 6.

FIG. 8 is a planar view corresponding to FIG. 6 showing the cutting insert in a clamped state.

FIG. 9 is a section corresponding to FIG. 7 showing the cutting insert in the clamped state according to FIG. 8.

FIG. 10 is a section corresponding to FIG. 7 showing an alternative embodiment of the cutting tool according to the invention, whereby the cutting insert is shown in a mounted, although not clamped state.

FIG. 11 is an analogous section showing the cutting insert in a clamped state.

FIG. 12 is a horizontal section through the tool shaft according to FIGS. 10 and 11.

DETAILED DESCRIPTION OF PREFERRED EMBODIMENTS OF THE INVENTION

Figure 13:
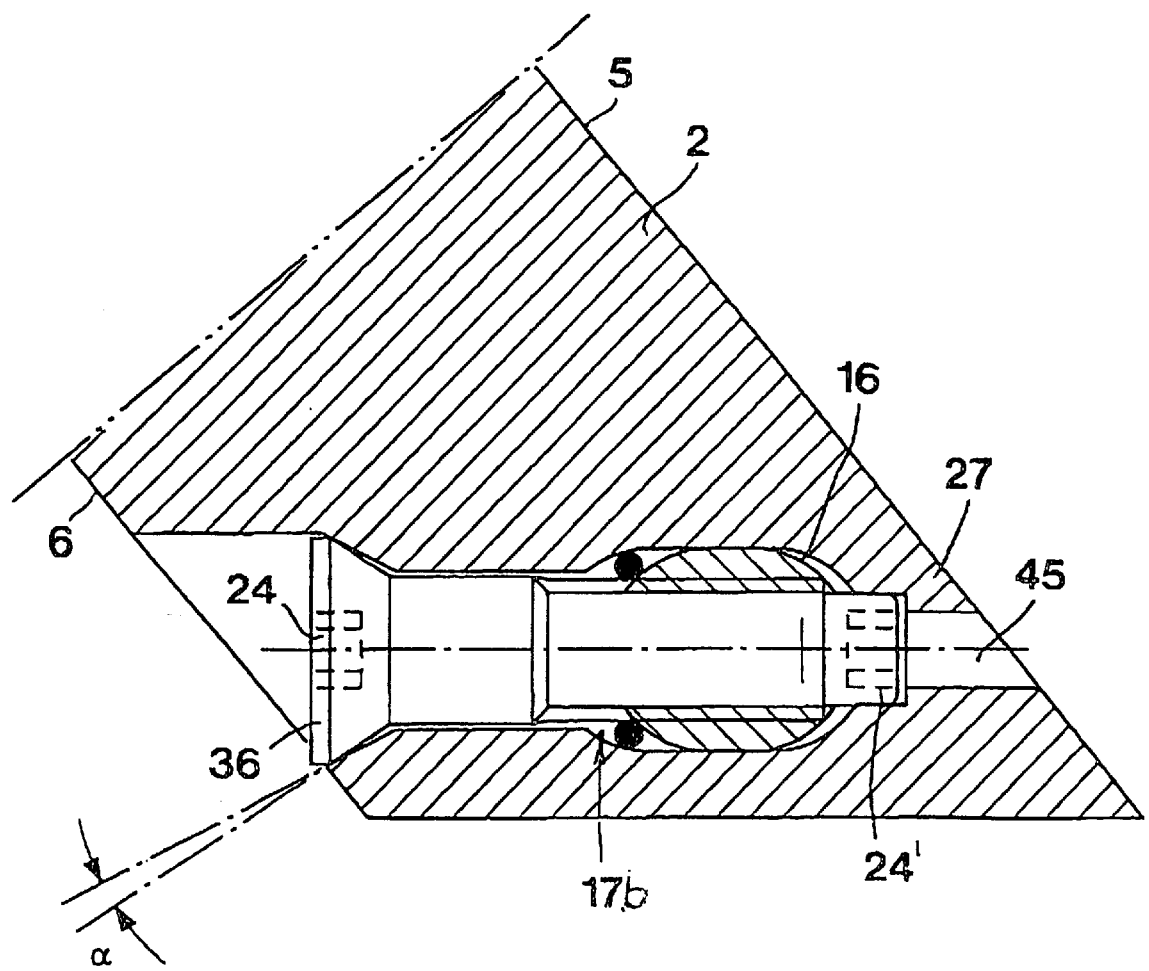
FIG. 13 is a section corresponding to FIG. 12 showing an additional alternative embodiment.

The cutting tool illustrated in FIG. 1 is intended for turning and is composed of a cutting insert 1 and a holder 2. In the example, the cutting insert 1 consists of an indexable cutting insert having a rhombic basic shape. In the cutting insert, there is a central hole 3. The insert holder 2 consists of a long narrow shaft, which in the example is shown having a quadrangular cross-sectional shape. Generally, the shaft is thus defined by four sides defining respective plane surfaces 4–7. A first of those surfaces 4 will, for the sake of simplicity, henceforth be denominated as a top surface, while the surfaces 5, 6 will be denominated side surfaces and the surface 7 a bottom surface. In this connection, it should, however, be emphasised that the tool in practical use may be oriented in any arbitrary way in space. A front-end surface 8 extends at an acute angle to the side surface 5 (in the example, the nose angle is 50°). Each of the surfaces 5, 6 interconnects the surfaces 4 and 7.

In connection with the acute corner that is formed between the surfaces 5 and 8, a seat for the cutting insert 1 is formed which in its entirety is designated 9. The seat has the same rhombic basic shape as the cutting insert and is delimited by on the one hand a bottom surface 10, and on the other hand two support surfaces 11, 12. The bottom surface 10 includes two free edges 13 and 14, respectively. At the inner corner of the seat, there is a recess 15, which in a conventional way guarantees that an inner corner of the cutting insert does not contact the support surfaces 11, 12.

A clamping mechanism is built into the shaft 2, which comprises on the one hand a clamping body 16, and on the other hand a screw 17. On the topside of the clamping body 16, there is a finger 18, which can engage in the hole 3 of the cutting insert and be utilised for clamping the cutting insert in the seat 9. The clamping body 16 is housed in a cavity 19, in connection with which a bore 20 for the screw 17 is present. The screw 17 is formed having a thick first end portion 21, as well as a thinner intermediate portion 22.

As far as the shown cutting tool has been described hitherto, the same is in all essentials known from JP 2000-254 806.

Unlike the clamping screw according to JP 2000-254 806, the screw 17 is formed without a thread on the first portion 21 thereof. More precisely, said first portion 21 of the screw is formed with a cylindrical, smooth envelope surface. Correspondingly, the bore 20 in the shaft 2 is cylindrical and has a smooth surface, whereby the diameter of the bore suitably is only slightly larger than the outer diameter of the first portion 21 in order to guarantee a fine fit between the screw and the bore. The bore 20 ports in one of the side surfaces of the shaft, viz., the side surface 6 that is distanced from the seat 9. In the example, the bore 20 ports in a widened hollow 23, which in turn opens in the side surface 6. In the end surface of the screw, accessible from the outside, there is a spanner socket 24, e.g. having a hexagonal or another polygonal shape.

The bore 20 and the screw 17 extend in the example parallel to the end surface 8 of the shaft 2, more precisely along a geometric axis designated X.

Characteristic of the invention is that the cavity 19 for the clamping body 16 is, with the exception of the bore 20 from all sides surrounded by material in the plane which is shown in FIG. 4 and which in FIG. 2 is designated A—A. Thus, the cavity 19 is surrounded not only by side walls 25, 26 disposed on respective sides of the X-axis, but also by an end wall 27 which intersects the free edge 14 of the seat 9, the wall 27 being intersected by the X-axis.

Therefore, with the exception of a central hole 28 for the finger 18, the cutting insert 1 therefore gets support along the entire bottom side thereof. In other words, the bottom surface 10 of the seat forms an endless support surface around the hole 18, whereby all edge areas along the bottom side of the cutting insert get a satisfaction support.

As is seen in FIG. 2, the cavity 19 opens in the bottom side 7 of the shaft 2, i.e. in the side of the shaft that is diametrically opposite the seat 9. The hole 28, extending between the cavity 19 and the bottom surface 10 of the seat has a cross-section which is smaller than a length of the body 16 in a direction parallel to the axis X. Thus, there is formed a flange 29 extending round the full circumference, the underside of which serves as a support surface for the top side of the clamping body 16. In the example, the bottom side of the flange 29 and the topside of the clamping body 16 are plane. As is furthermore seen in FIG. 2, the finger 18 has a slightly curved shape. More precisely, the top part of the finger is curved in a direction inwards generally towards the inner corner of the seat. The diameter of the hole 28 is large enough for the finger to be able to pass vertically through the hole.

From the above it is apparent that the clamping body 16 at assembly may be inserted from below into the cavity 19, whereby the finger may be introduced through the hole 28 to the position that is shown in FIG. 2.

The second portion 22 of the screw 17 is formed with a male thread 30 that is in engagement with a female thread (unnumbered) in a through hole 31 extending through the clamping body 16. This threaded connection constitutes the only thread on the screw.

The front end of the screw is supported for rotation. More particularly, in the embodiment according to FIGS. 1–9, the front end 32 of the screw 17 is arranged to be pressed axially against the inside 33 of the end wall 27 which defines the side surface 5 (see FIG. 3). Said inside 33 of the end wall 27 thus forms a fixed abutment surface 33 from which the clamping body 16 may be distanced by rotation of the screw 17. A depression 34 is formed in the abutment surface 33, which has a rotationally symmetrical basic shape and is coaxially located in the centre axis of the bore 20 and the screw 17. In other words, the centre of the depression 34 lies in the X-axis. Also the free end, or second end portion, 32 of the screw is formed with a rotationally symmetrical basic shape. In the example, the depression 34 has a conical basic shape, while the free end 32 of the screw has a spherical basic shape. The geometrical shape of the depression and the end of the screw, respectively, may however vary. For instance, it is feasible to design the two surfaces in question with a spherical shape, but with different radii.

The Function of the Cutting Tool According to the Invention

When assembling the clamping mechanism of the tool, the clamping body 16 is inserted into the cavity 19 through the bottom side of the holder 2, and then the screw 17 is inserted from the side into the bore 20 in order to then be screwed into the threaded through hole 31 in the clamping body. During use of the tool, the clamping mechanism may be adjusted in two different positions, viz. a starting position in which the cutting insert 1 may be mounted and dismounted, respectively, and a clamping position in which the cutting insert is clamped in the seat. Said two positions are best illustrated in FIGS. 6, 7, and 8, 9, respectively.

In FIGS. 6 and 7, the clamping body 16 of the mechanism is shown in a starting position in which the same is located next to or near the end wall 27. This starting position is indicated by the arrow C. In the starting position, the cutting insert 1 may be inserted from above down into the seat without obstruction by the finger 18.

In order to clamp the cutting insert, the screw 17 is rotated by means of a spanner (not shown) which is inserted from the side in the spanner socket 24. Upon rotation of the screw, with the free end of the screw bearing pressed axially against the end wall 27, the thread connection brings causes the clamping body 16 to move away from the end wall 27 (see the arrow D in FIG. 9) to a position in which the finger 18 causes the side surfaces of the cutting insert to be pressed against the corresponding support surfaces 11, 12 of the seat. Although the clamping body 16 and the finger 18 in this connection move in a direction (the X-axis) that differs from a corner bisector B between the two acute corners of the cutting insert (see FIG. 5), the cutting insert will be pressed against both of the support surfaces 11, 12, viz. by a certain, greater component force against the support surface 11 and a second, smaller component force against the support surface 12.

The clamping force from the finger 18 is transferred to the cutting insert at a determined contact point or contact surface (not shown), which is situated at a relatively high level in the cutting insert, more precisely along the upper part of the surface 35, formed with a curved, rotationally symmetrical shape, which defines the hole 3 in the cutting insert.

Characteristic of the embodiment shown in FIGS. 1–9 is that the end wall 27 is subjected to a compressive force in connection with clamping of the cutting insert. Said compressive force is achieved by the fact that the end of the screw 32 is kept pressed against the abutment surface 33 (particularly the surface that defines the depression 34), whereby the clamping body is pushed away from the abutment surface 33 in response to rotation of the screw.

Reference is now made to FIGS. 10–12, which illustrate an alternative embodiment according to which the screw 17a has applied thereto a tensile force.

In this alternative embodiment, the cylindrical first portion 21a of the screw 17a is formed with a head 36, which is pressed against an abutment surface 37 that faces away from the bore 20. In the example, the head 36 as well as the abutment surface 37 are conical. More precisely, the cone surface of the head is formed with a cone angle, which is larger than the cone angle of the abutment surface 37 (the angular difference is outlined at α in FIG. 12). In this way, the effect is obtained that the thin part of the cone surface of the head cannot contact, and be damaged by, the edge defined by the transition between the cone surface 37 and the cylindrical bore 20.

Also in this case, a spanner socket 24 is formed in the end of the screw, more precisely in the end surface of the head 36.

At the front end thereof, distanced from the head 36, the screw has a centring cylindrical section 38, having a substantially cylindrical envelope surface. Said cylindrical section 38 is received in a cylindrical depression 39 in the end wall 27 for rotation relative to the wall 27.

It should be pointed out that the clamping body 16 (like the clamping body 16 according to the previously described embodiment) has opposite, plane support surfaces 40, 41, that are mutually parallel. Said support surfaces abut with a certain fit against two plane surfaces 42, 43, which define the cavity 19. When the clamping body moves backwards and forwards in the cavity, said cooperating pairs of surfaces 40, 42; 41, 43 control the clamping body so that neither the clamping body nor the appurtenant finger 18 tilts or turns laterally. In other words, the support surfaces guarantee that the finger 19 always moves linearly and acts against one and the same determined contact point when the finger is pressed against the surface 35 of the insert hole.

In FIGS. 10–12, numeral 44 designates an O-ring (of rubber or the like) that serves as an elastic spring device, which on the one hand is compressible when the clamping body is moved in the clamping direction, i.e., away from the side surface 5 of the holder, and on the other hand is expandable when the clamping unit is moved in a disengaging direction (compare FIGS. 10 and 11).

The function of the mechanism illustrated in FIGS. 10–12 should be apparent. When the screw 17a is tightened (i.e., rotates in one of the directions of rotation), the clamping body 16 moves from the disengaging position according to FIG. 10 to the clamping position according to FIG. 11. When the screw is rotated in the opposite direction, the clamping body, together with the appurtenant finger 18, is moved from the clamping position to the starting position in which the cutting insert may be released from the seat.

Reference is now made to FIG. 13, which illustrates an embodiment according to which the screw 17b, like the screw 17a in the tool according to FIGS. 10–12, includes a head 6 in order to apply to the screw 17b a tensile force in connection with clamping of the cutting insert. In this case, the screw 17b is formed with two spanner sockets, viz. not only a first spanner socket 24 in the head 36, but also a second spanner socket 24' in the opposite end of the screw. Said second spanner socket 24' is accessible via a through hole 45, which is recessed in the end wall 27 and ports in the side surface 5 of the holder 2. As is seen in FIG. 13, the hole 45 is only slightly larger than the spanner socket 24' in order to guarantee a maximum material strength in the end wall 27. In this connection, it should be emphasised that the end wall 27 neither in the embodiment according to FIG. 13, nor in the embodiment according to FIGS. 10–12, is exposed to any pressure in connection with the clamping action. In other words, the wall portion 27 is not loaded by the screw.

In the embodiment according to FIG. 13, the spanner that is required in order to rotate the screw may be applied at either end of the screw. In this connection, it should however, be pointed out that the screw also may be formed with only one of the spanner sockets 24 or 24'.

Advantages of the Invention

Beside the general advantage of enabling clamping of the cutting insert by means of a screw which is accessible from a direction other than the side in which the insert seat is formed, the cutting tool according to the invention has the advantage that the cutting insert receives a satisfactory support along all edge portions, since the bottom surface of the seat completely surrounds the finger 18. In this way, the risk of breakage of the cutting insert and/or the creation of deformations in the shaft or the insert holder is reduced. Furthermore, thanks to the top side of the clamping body 16 being supported against a flange 29, which surrounds the hole for the finger of the clamping body, the risk of deflection deformations in the screw and in the clamping body finger are counteracted. Moreover, such deflection deformations are counteracted by the fact that the screw is supported at each of the two opposite ends thereof, viz. in the cylindrical bore 20, as well as in the depression 34 or 39 in the end wall 27.

Feasible Modifications of the Invention

The invention is not solely restricted to the embodiments described above and illustrated in the drawings. Thus, it is possible to provide the clamping mechanism in shafts or insert holders other than those having a quadrangular cross-sectional shape. Thus, the shaft may have a circular cross-sectional shape or a polygonal cross-sectional shape other than quadrangular. It is essential according to the invention that the screw for the clamping body is accessible from a direction other than the first side 4 in which the seat for the cutting insert is located. In the embodiments according to FIGS. 10–13, the head of the tightening screw may have a shape other than conical. For instance, the screw head may be flat or cylindrical and arranged to be pressed against a plane, ring-shaped abutment surface instead of against a conical abutment surface. In conclusion, it should be pointed out that the screw for the clamping body may be formed with means other than a polygonal socket for spanners. For instance, the screw may be formed with a groove for a screwdriver. The concept "spanner socket" should thus be interpreted in a broad sense to includes such other means.

What is claimed is:

1. A tool for chip removing machining comprising:
    a holder including:
        a first side in which an insert seat is formed for receiving a cutting insert, the seat including a bottom surface and an upright support surface, the bottom surface including a hole formed therethrough,
        a second side disposed opposite the first side,
        a third side interconnecting the first and second sides,
        a fourth side disposed opposite the third side and interconnecting the first and second sides,
        a cavity formed within the holder and communicating with the cavity, and
        a bore extending from the third side toward the fourth side and communicating with the cavity, the bore being spaced from the first side;
    a clamping body disposed in the cavity and movable in a direction parallel to a center axis of the bore, the clamping body including a
        through-hole extending along the center axis, the through-hole including a female screw thread,
        a finger projecting from the clamping body and extending through the hole, the hole being of larger cross section than the finger; and
    a rotatable screw including:
        a first end disposed in the bore,
        an intermediate portion disposed within the through-hole of the clamping body and including a male screw thread in threaded engagement with the female screw thread, and
        a second end supported by an end wall defined by the fourth side;
    wherein the finger is completely surrounded by the bottom surface of the insert seat.

2. The tool according to claim 1 wherein the bore is threadless, so that the male screw thread constitutes a sole screw thread of the screw.

3. The tool according to claim 1 wherein the bottom surface of the insert seat intersects the fourth side.

4. The tool according to claim 1 wherein the cavity opens into an outer surface defined by the second side.

5. The tool according to claim 1 wherein the cavity includes a surface through which the finger extends and which defines a support for a surface of the clamping body from which the finger extends, the support extending completely around the finger.

6. The tool according to claim 1 wherein the end wall has formed therein a depression in which the second end of the screw is disposed.

7. The tool according to claim 6 wherein the depression has a generally conical shape.

8. The tool according to claim 6 wherein the second end of the screw has a generally spherical shape.

9. The tool according to claim 8 wherein the depression has a generally conical shape.

10. The tool according to claim 1 wherein the first end of the screw has a larger diameter than the intermediate portion.

11. The tool according to claim 1 wherein the second end of the screw presses axially against the end wall.

12. The tool according to claim 1 wherein the first end includes a head which bears axially against an abutment surface disposed in the bore.

13. The tool according to claim 12 wherein the second end of the screw is cylindrical and disposed in a cylindrical depression formed in the end wall.

14. The tool according to claim 12 wherein the second end of the screw includes a socket for receiving a spanner, the end wall including a through-hole for accessing the spanner.

15. The tool according to claim 12 further including an elastic element disposed in the cavity and arranged to be compressed when the clamping body is moved away from the end wall.

16. The tool according to claim 1 wherein the clamping body includes a pair of parallel planar surfaces engageable with parallel planar side surfaces of the cavity for counteracting tilting of the clamping body.

17. A tool for chip removing machining comprising:
   a holder including:
      a first side in which an insert seat is formed for receiving a cutting insert, the seat including a bottom surface and an upright support surface, the bottom surface including a hole formed therethrough,
      a second side disposed opposite the first side,
      a third side interconnecting the first and second sides,
      a fourth side disposed opposite the third side and interconnecting the first and second sides,
      a cavity formed within the holder and communicating with the cavity, the cavity opening into an outer surface defined by the second side, and
      a bore extending from the third side toward the fourth side and communicating with the cavity, the bore being spaced from the first side,
   a clamping body insertable into the cavity through the second side and movable within the cavity in a direction parallel to a center axis of the bore, the clamping body including a through-hole extending along the center axis, the through-hole including a female screw thread,
   a finger projecting from the clamping body and extending through the hole, the hole being of larger cross section than the finger; and
   rotatable screw including:
      a first end disposed in the bore, and
      an intermediate portion disposed within the through-hole of the clamping body and including a male screw thread in threaded engagement with the female screw thread;
   wherein the finger is completely surrounded by the bottom surface of the insert seat.

* * * * *